S. SVANSON.

Revolving Harrow.

No. 62,904.

Patented Mar. 12, 1867.

Witnesses:
Theo. Tusch
Wm Trewin

Inventor:
Svan Svanson
per Munn & Co
Attorneys

United States Patent Office.

SVAN SVANSON, OF SWEEDEPOINT, IOWA.

Letters Patent No. 62,904, dated March 12, 1867.

---

IMPROVEMENT IN HARROWS.

---

The Schedule referred to in these Letters Patent and making part of the same.

---

TO ALL WHOM IT MAY CONCERN:

Be it known that I, SVAN SVANSON, of Sweedepoint, in the county of Boone, and State of Iowa, have invented a new and improved Harrow; and I do hereby declare that the following is a full, clear, and exact description thereof, which will enable others skilled in the art to make and use the same, reference being had to the accompanying drawings, forming part of this specification, in which—

Figure 1:
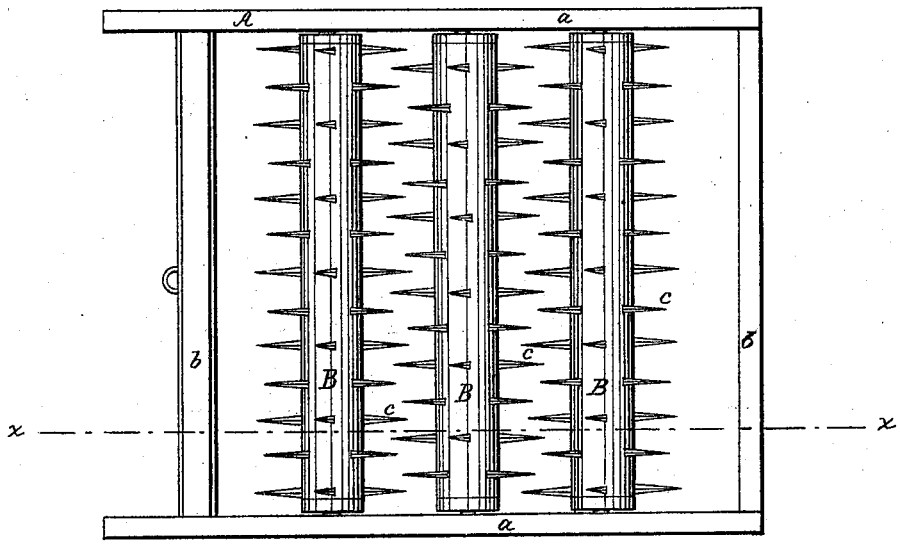

Figure 1 is a plan or top view of my invention.

Figure 2:
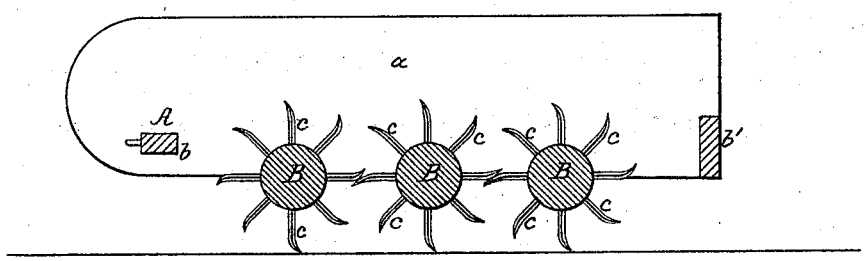

Figure 2, a side sectional view of the same, taken in the line $x\ x$, fig. 1.

Similar letters of reference indicate like parts.

This invention relates to a new and improved harrow for pulverizing the earth after being ploughed.

The invention consists of a series of toothed rollers, placed in a frame, and arranged substantially as hereinafter set forth.

The frame A of the harrow is composed of two side pieces, $a\ a$, connected by cross-bars $b\ b'$ at their front and rear ends. The draught-chain is attached to the front cross-bar $b$. B B B are three parallel rollers, the journals of which have their bearings at the lower parts or edges of the said pieces $a\ a$. These rollers are provided with teeth $c$, slightly curved, as shown clearly in fig. 2, and the teeth of one roller are in line with the centres of the spaces between the teeth of the adjoining roller, as shown clearly in fig. 1. The frame $a$ bears the rollers B B B on the lower side, and its forward ends are rounded. By reversing this frame the harrow can be drawn along the ground, resting on the sides, which formerly constituted the top, and thus the teeth will not come in contact with the earth. These teeth $c$ are of such a length that they will penetrate into the earth a sufficient depth as the implement is drawn along, and it will be seen from the above description that the teeth $c$ of the several rollers cannot interfere with each other; but, on the contrary, will assist each other in the way of the stripping off of weeds, trash, &c., which may have a tendency to cling to them.

This harrow will operate very efficiently, and will be of easy draught. It also may be manufactured at a moderate cost, and in consequence of the toothed rollers being in the lower part of the frame A, the latter may be inserted so that the teeth of the rollers will be above the surface of the ground, and the implement, therefore, rendered capable of being drawn from place to place with the greatest facility.

Having thus described my invention, what I claim as new, and desire to secure by Letters Patent is—

The frame $a$, carrying the toothed rollers B B B, adapted to be reversed and drawn along the surface of the ground, by the top side becoming the bottom, in the manner and for the purpose specified.

SVAN SVANSON.

Witnesses:
CHARLES J. CASSEL,
ANDERS GUSTAF SVENSON.